United States Patent [19]

Van Gestel

[11] Patent Number: 6,057,886
[45] Date of Patent: May 2, 2000

[54] TRANSMISSION OF DATA ITEMS

[75] Inventor: Henricus A. W. Van Gestel, Eindhoven, Netherlands

[73] Assignee: U.S. Philips Corporation, New York, N.Y.

[21] Appl. No.: 08/754,666

[22] Filed: Nov. 21, 1996

[30] Foreign Application Priority Data

Nov. 24, 1995 [EP] European Pat. Off. ............... 95203230

[51] Int. Cl.[7] ....................................................... H04N 7/00
[52] U.S. Cl. .................. 348/467; 348/6; 370/476
[58] Field of Search ................ 348/6, 461, 463, 348/465, 467, 468, 473, 906, 460; 375/295, 260; 370/389, 471, 476, 473, 394, 428, 470, 474

[56] References Cited

U.S. PATENT DOCUMENTS

| | | | |
|---|---|---|---|
| 4,975,952 | 12/1990 | Mabey et al. ............................. | 380/49 |
| 5,050,166 | 9/1991 | Cantoni et al. ......................... | 370/94.1 |
| 5,333,135 | 7/1994 | Wendrof .................................. | 370/94.1 |
| 5,473,609 | 12/1995 | Chaney .................................... | 370/94.1 |
| 5,483,287 | 1/1996 | Siracusa ................................... | 348/426 |
| 5,717,689 | 2/1998 | Ayanoglu ................................. | 370/349 |

OTHER PUBLICATIONS

"Protocol for a TV–Guide using Electronic Data Transmission, Draft 1", EACEM Technical Report No. 11, Aug. 1995.

*Primary Examiner*—Thomas G. Black
*Assistant Examiner*—Uyen Le
*Attorney, Agent, or Firm*—Laurie E. Gathman

[57] ABSTRACT

A system for transmitting a plurality of data items from a transmitter to one or more receivers. Each data item (Di) is identified by a unique number (i) within a given range. According to the invention, a field (F) comprising both ends ($k_1,k_2$) of the given range is also transmitted. This allows a receiver to check whether all data items have been received and to check which data item(s) is (are) missing, if any. The invention may generally be used in systems delivering data items to multimedia stations. The invention is particularly suitable for transmitting electronic program guide information in a television broadcast system.

12 Claims, 5 Drawing Sheets

| F=0,4 | D0 | D1 | F=0,4 | D0 | D2 | F=0,4 | D0 | D3 | F=0,4 | D0 | D4 | F=1,4 | D1 | D2 | F=1,4 | D1 | D3 | F=1,4 | D1 | D4 |

$t=t_1$ $\qquad\qquad\qquad\qquad\qquad\qquad$ $t=t_2$

TRANSMISSION OF DATA ITEMS

FIELD OF THE INVENTION

The invention relates to a method of transmitting a plurality of data items, comprising the steps of transmitting a field indicating the number of data items, and transmitting the plurality of data items, each item including an identifier. The invention also relates to a method of receiving said data items, and a transmitter and receiver for carrying out said methods.

BACKGROUND OF THE INVENTION

A typical example of a known method of transmitting data items as mentioned in the opening paragraph is disclosed in "Protocol for a TV-Guide using Electronic Data transmission, Draft 1", EACEM Technical Report No. 11, August 1995. In this prior-art method, each data item accommodates programming information such as start time, stop time, title, etc. of a television program to be broadcast. Each data item includes an identifier (a 24-bit field denoted program_id) for identifying each programming data item. Also transmitted is overhead or system information which includes, inter alia, a field (no_of_programmes) indicating how many data items are being delivered by the information provider.

A possible carrier for the transmission of electronic programme guide (EPG for short) data items are the picture lines in the vertical blanking interval (VBI) of a television signal. The data items are transmitted cyclically so as to allow television receivers and video recorders to collect and store the items on a regular basis and keep the stored information updated.

As the transmission capacity of the carrier is generally restricted (the VBI is also used for test signals and teletext) and the amount of data to be transmitted may be very large, it is envisaged to transmit some data items more frequently than others. For example, the programming data for television programmes to be broadcast within the next few hours or so will be transmitted once per few minutes, whereas the programming data for programmes to be broadcast the following day or days will be transmitted once per few hours or even once per day.

It has been proposed to number the data items consecutively, by virtue of their identifier, in a predetermined order. In the EPG application, for example, the data items are envisaged to be numbered in the order of the scheduled start time of the relevant television programme. If K data items are transmitted in total, the data item representing the next programme to be broadcast will thus be assigned the number 0, whereas the data item representing the last programme to be broadcast next will be assigned the number K-1. The proposed strategy renders it possible for a receiver to check whether all data items have been received, and to detect which data item(s) is (are) missing.

FIG. 1 shows a timing diagram to illustrate the disadvantages of this strategy. The Figure shows a data stream comprising a plurality of data items Di, the index i being a number assigned to the relevant data item by virtue of its identifier. As has been attempted to show, the data item D0 is transmitted more frequently than the data items D1 . . . D4. The data stream further includes the regular transmission of a field F=k, the value k representing the number of transmitted data items. As the Figure illustrates, five data items D0 . . . D4 are transmitted up to $t=t_1$. Thereafter, data item D0 is no longer transmitted because, for example, the relevant television programme has already been broadcast. The above-mentioned strategy of transmitting a field indicating the number of data items, and consecutively numbering the data items, requires the transmitter to decrease the field value k by 1 and to renumber the respective identifiers i from 1 . . . 4 into 0 . . . 3 after $t=t_1$. In other words, data item D0 transmitted after $t=t_1$ is not the same as data item D0 transmitted before, but corresponds to former data item D1.

It is cumbersome for a transmitter to renumber all the data items for transmission, i.e. to update all the identifiers. Moreover, it is difficult for a receiver to process the updated field value k and identifiers i, and check the correctness and completeness of the received information. For example, from $t=t_1$ the receiver has been informed by virtue of the field F=4 that there are four relevant data items to be acquired. They are necessarily numbered D0 . . . D3. However, at $t=t_2$, the data items D0 (former D1) and D1 (former D2) have been updated, whereas the former data items D2 . . . D4 are still locally stored. Not only does the number of stored data items correspond any longer to the number as transmitted, the receiver has also stored one data item twice in the memory with two different identifiers (new D1 and former D2). Needless to say that this strategy is a potential source of problems and, consequently, processing errors.

OBJECT AND SUMMARY OF THE INVENTION

It is an object of the invention to provide a method of transmitting data items, in which the above-mentioned problems are adequately solved.

To this end, the method according to the invention is characterized in that the plurality of identifiers form an ordered sequence, and in that the field indicating the number of data items comprises a first and a second subfield, said subfields representing the range of said sequence of identifiers. It is thereby achieved that the transmitter no longer needs to update each data item identifier when a data item is removed from transmission. It only needs to update one of the subfields. Moreover, immediately after the reception of the updated field, the receiver can now check the completeness of the stored data items as well as identify missing ones.

Advantageously, the subfields are modulo-N numbers, where N is the maximum number of data items. In that case, the identifiers of data items never need to be modified.

DESCRIPTION OF EMBODIMENTS

The invention will now be described with reference to the transmission of electronic programme guide data items from a transmitter to a plurality of television receivers and/or video recorders. However, the invention is not restricted to this type of application. The method may be used in any data delivery system, in particular multimedia systems.

Figure 2:
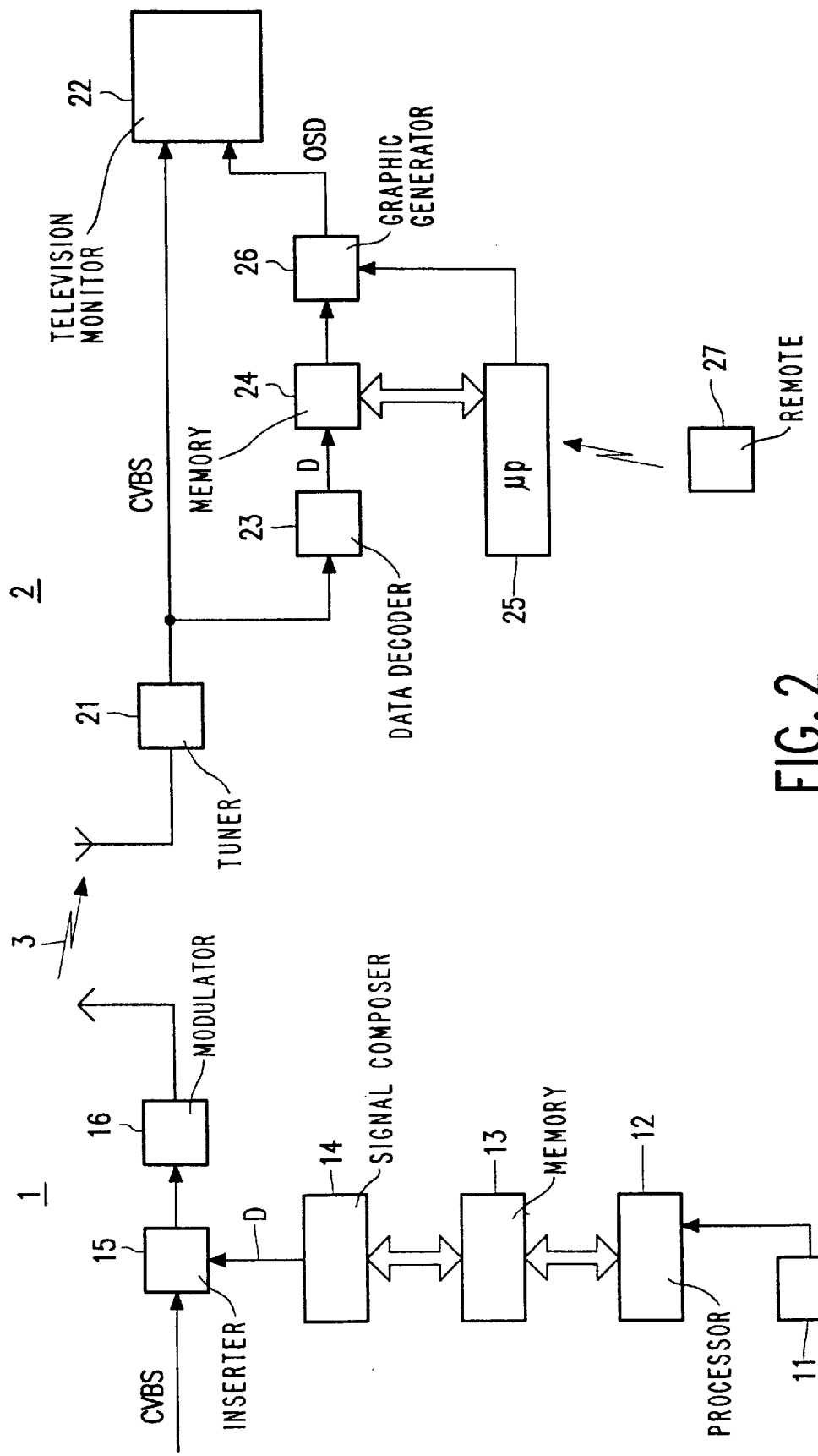
FIG. 2 shows a system comprising a transmitter and a receiver for carrying out the method according to the invention.

FIG. 2 shows a system comprising a transmitter 1 and a receiver 2 for carrying out the method according to the invention. The transmitter comprises an editing terminal 11 for creating the data items, a processor 12, a memory 13 for storing the data items, and a signal composer 14 for accommodating the information in a data signal D. The transmitter further comprises an inserter 15 for inserting the data signal D in the vertical blanking interval of a composite video signal CVBS. The television signal thus obtained is applied to a modulator 16 for broadcast via a transmission medium 3.

The receiver comprises a tuner 21 for receiving the television signal. The received signal CVBS is directly applied to a television monitor 22 so as to display the received television programme. The signal is also applied to a data decoder 23 which is adapted to acquire the data signal and store the received data in a memory 24. A microprocessor 25 is connected to the memory 24 so as to process the data stored therein. The receiver further comprises a graphic generator 26 adapted to read a predetermined section of memory 24 and generate an On-Screen-Display picture OSD defined by the data stored in said memory section. The OSD picture includes a cursor, the position of which is defined by the microprocessor in response to positioning signals from a remote cursor control device 27.

In practice, the receiver described above may take the form of a videorecorder. The videorecorder may have an embedded display device 22 or an output for applying the display signals CVBS and OSD to a separate display device 22 such as a television set.

The EPG data items as well as menus for accessing and presenting the programme guide are created by editorial staff using editing terminal 11. The data items Di are processed by processor 12 and stored in respective segments of memory 13. The processor also generates the field F to be transmitted and stores this field in a predetermined memory section. The signal composer 14 assembles the stored data items and field and forms the data signal D. Data which is most sensible to transmission errors, such as headers, dates and times, string lengths, identifiers, etc., are protected by a Hamming code.

Figure 3:
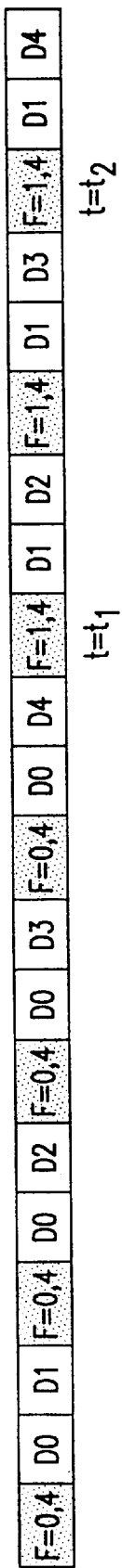
FIG. 3 shows a timing diagram illustrating the data format of the data signal transmitted by the transmitter shown in FIG. 2.

FIG. 3 shows a timing diagram illustrating the data format of the transmitted data signal D. The same data items are transmitted as in FIG. 1. However, the signal format differs in two aspects. First, the fields F are now denoted F=$k_1,k_2$, indicating that the field comprises two subfields having the values $k_1$ and $k_2$, respectively. Further, the identifiers i keep their value, even if one of them is no longer transmitted or if a new data item is added. In the present example, where five data items D0 . . . D4 are transmitted during the period of time up to t=$t_1$, F has the value F=0,4. The first subfield $k_1$=0 indicates the low end of the range of identifiers i associated with the data items D0 . . . D4. The second subfield $k_2$=4 indicates the high end of the range of identifiers. After t=$t_1$, the field F assumes the value F=1,4. Data item D0 is no longer transmitted, but the identifiers of the other data items keep their original identifier, i.e. i=1 . . . 4. If a new data item is added, its identifier will acquire the value i=5 and the field F will be updated to F=1,5.

In the EPG example, where data items are frequently removed and new items added, the two subfield values are frequently updated. In practice, the subfields are encoded, using a predetermined number of bits, say n, allowing a maximum number N=$2^n$ different data items to be identified. In a preferred embodiment of the invention, the subfields $k_1$ and $k_2$ are modulo-N numbers. This implies that the identifiers of data items, once assigned, never needed to be modified. For example, if n=10, the field value F=1021,1 is allowed, indicating that the data items D1021, D1022, D1023, D0, D1 are transmitted. A receiver can easily check whether these items have indeed been received.

Figure 1:
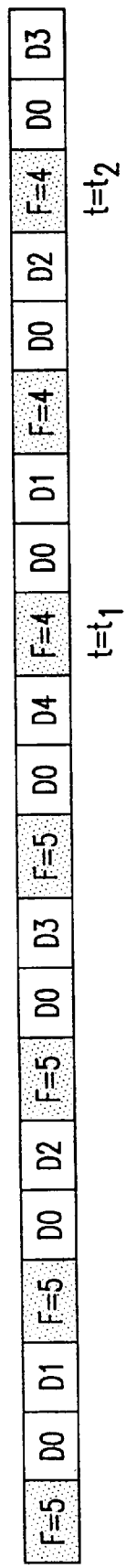
FIG. 1, already described, shows a timing diagram to illustrate the disadvantages of the prior-art method.
Figure 4:
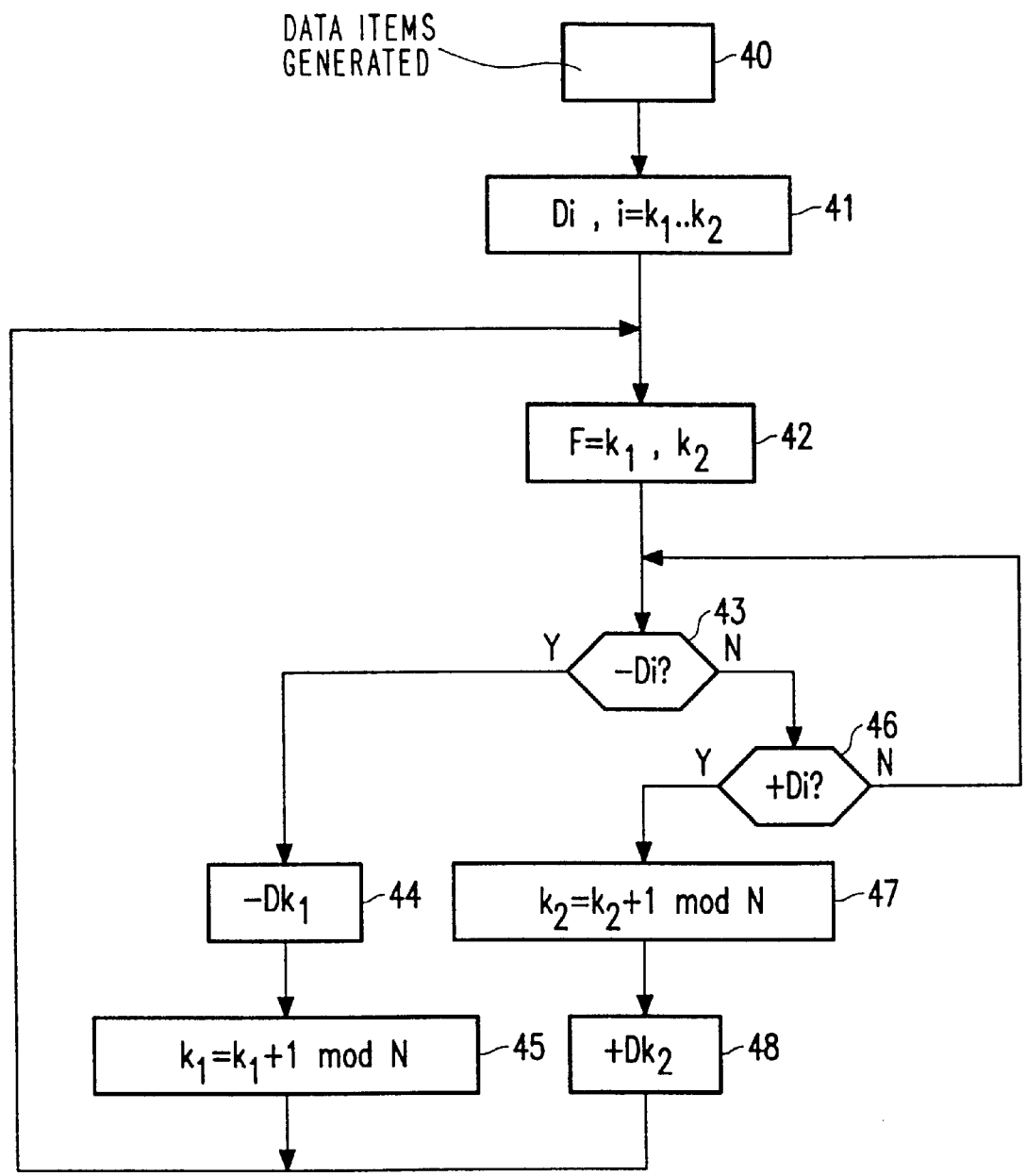
FIG. 4 shows a flowchart of processing steps carried out by the transmitter of FIG. 2.

FIG. 4 shows a flowchart of processing steps carried out by the transmitter of FIG. 1. In a step 40, an initial plurality of data items to be transmitted are generated in editing terminal 11 (FIG. 2). Each data item comprises data elements defining a television programme to be broadcast such as start time, stop time, broadcaster station, programme title, etc. In a step 41, the processor orders the data items in an ascending sequence as a function of start time and adds an identifier i to each data item. The identifier is, for example, a 16-bit number. The numbers are assigned in numerical order, the value i=$k_1$ being assigned to the first programme to be broadcast and the value i=$k_2$ to the last programme. In practice, the value $k_1$ will initially be 0. However, this is not essential. In a step 42, the processor generates the field F comprising two 16-bits subfields and stores said field in the memory. The first subfield is given the value $k_1$, the second subfield is given the value $k_2$.

The field F=$k_1,k_2$ and the data items Di (i=$k_1$. . . $k_2$) stored in the memory are autonomously transmitted in a predetermined sequence, for example as shown in FIG. 3. In a step 43, the processor checks whether the first data item still needs to be transmitted. If it appears to be superfluous, the processor removes this data item D$k_1$ from the memory in a step 44, increases $k_1$ by one in a step 45 and returns to step 42 so as to update the field F in the transmitted data signal. In a step 46, the processor checks whether a new data item is received from the editing terminal. In the affirmative case, the processor increases $k_2$ by one in a step 47, adds identifier i=$k_2$ to said data item and stores it in the memory in a step 48. Then the processor returns to step 42 so as to update the field F in the transmitted data signal. If a data item is neither removed nor added, the processor returns to step 43 to await such updates.

Figure 5:
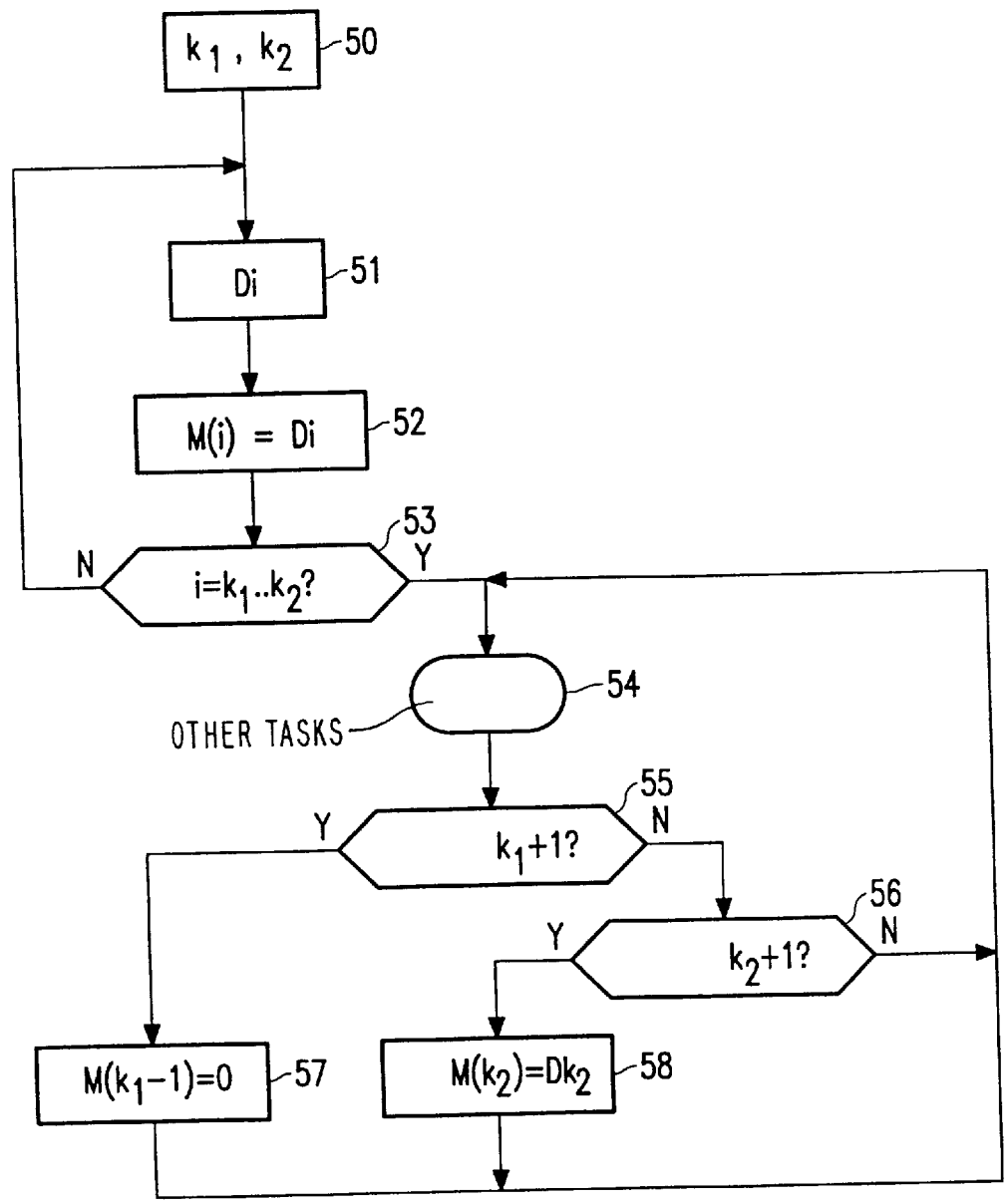
FIG. 5 shows a flowchart of processing steps carried out by the receiver shown in FIG. 2.

The operation of the receiver is determined by a control programme stored in a memory of microprocessor 25 (FIG. 2). FIG. 5 shows a flow chart of operations carried out by the microprocessor. It is assumed that the field F and the data items Di received thus far have autonomously been stored in a buffer section of memory 24 (FIG. 2). In a step 50, the processor retrieves the most recently stored field F and parses it into the subfield values $k_1$ and $k_2$ contained therein. In a step 51, a data item Di is retrieved from the buffer and its identifier i is read. In a step 52, the data item Di is stored in a memory section M(i). In a step 53, the processor checks whether all data items with identifier i in the range i=$k_1$. . . $k_2$ have been received and stored. As long as this is not the case, the steps 51 and 52 are repeated. If all relevant data items are available, the processor is free to perform other tasks 54 which are not relevant to the invention.

The processor further checks on a regular basis, in steps 55 and 56, whether the field F has been updated. As long as field F is not updated, the other tasks 54 are continued. In the step 55, it is checked whether the subfield value $k_1$ has been increased with respect to its former value. In that case, the relevant data items stored in the memory are no longer relevant and are erased in a step 57 (in FIG. 3, this erase step is shown for the case where $k_1$ is increased by one so that location M($k_1$−1) only is erased. In the step 56, it is checked whether the subfield value $k_2$ has been increased with respect to its former value. In that case, one or more new data items are added to the data signal and have probably already been stored in the buffer. The processor responds thereto by searching, in a step 58, the relevant data items Di and storing them in the memory (again, in FIG. 5, this step is shown for the case where $k_1$ is increased by one so that only one location $M(k_2)$ is written into. After these update actions, the processor is free again to perform the other tasks. Obviously, the test steps 55 and 56 take account of the modulo-N numbering of $k_1$ and $k_2$.

Although the invention has been described hereinbefore in terms of a television transmitter, television signal and television receiver, its applicability goes far beyond a television system. More particularly, the transmission medium may take the form of any suitable carrier, including satellite, cable or terrestrial networks as well as packaged media such as magnetic or optical discs or tapes. The receiver may, inter alia, take the form of a personal computer or a multimedia station.

In summary, a system is disclosed for transmitting a plurality of data items from a transmitter to one or more receivers. Each data item (Di) is identified by a unique number (i) within a given range. A field (F) comprising both ends ($k_1,k_2$) of said range is also transmitted. The invention allows a receiver to check whether all data items have been received and to check which data item(s) is (are) missing, if any. The invention may generally be used in systems delivering data items to multimedia stations. The invention is particularly suitable for transmitting electronic programme guide information in a television broadcast system.

What is claimed is:

1. A method of transmitting a plurality of data items, comprising the steps of:

transmitting a field indicating the number of data items;

transmitting the plurality of data items, each item including an identifier;

characterized in that the plurality of identifiers form an ordered sequence, and in that the field indicating the number of data items comprises a first and a second subfield, said subfields representing the range of said sequence of identifiers, the first subfield representing a beginning of the range and the second subfield representing an end of the range.

2. A method as claimed in claim 1, wherein the subfields are modulo-N numbers, where N is the maximum number of data items.

3. A method as claimed in claim 1, wherein the data items constitute information about television programmes to be broadcast.

4. A method of receiving and processing a plurality of data items from a transmitter, comprising the steps of:

receiving a field indicating the number of data items;

receiving the plurality of data items, each item including an identifier;

comparing the number of received data items with the number indicated by the received field to determine whether all data items have been received;

characterized in that the field indicating the number of data items comprises a first and a second subfield, said subfields representing the range of an ordered sequence of identifiers, the first subfield representing a beginning of the range and the second subfield representing an end of the range, the method further comprising the step of checking whether and which identifiers within said range are missing so as to determine which data items have not yet been received.

5. A method as claimed in claim 4, wherein the subfields are modulo-N numbers, where N is the maximum number of data items.

6. A method as claimed in claim 4, wherein the data items constitute information about television programmes to be broadcast.

7. A transmitter for transmitting a plurality of data items, comprising:

means for transmitting a field indicating the number of data items;

means for transmitting the plurality of data items, each item including an identifier;

characterized in that the plurality of identifiers form an ordered sequence, and in that the field indicating the number of data items comprises a first and a second subfield, said subfields representing the range of said sequence of identifiers, the first subfield representing a beginning of the range and the second subfield representing an end of the range.

8. A transmitter as claimed in claim 7, wherein the subfields are modulo-N numbers, where N is the maximum number of data items.

9. A transmitter as claimed in claim 7, wherein the data items constitute information about television programmes to be broadcast.

10. A receiver for receiving and processing a plurality of data items from a transmitter, comprising means for receiving a field indicating the number of data items;

means for receiving the plurality of data items, each item including an identifier;

means for comparing the number of received data items with the number indicated by the received field to determine whether all data items have been received;

characterized in that the field indicating the number of data items comprises a first and a second subfield, said subfields representing the range of an ordered sequence of identifiers, the first subfield representing a beginning of the range and the second subfield representing an end of the range, the receiver further comprising means for checking whether and which identifiers within said range are missing so as to determine which data items have not yet been received.

11. A receiver as claimed in claim 10, wherein the subfields are modulo-N numbers, where N is the maximum number of data items.

12. A receiver as claimed in claim 10, wherein the data items constitute information about television programmes to be broadcast.

* * * * *